United States Patent [19]

Kitazume

[11] 3,806,838

[45] Apr. 23, 1974

[54] DELAY DISTORTIONS REDUCING BRANCHING FILTER NETWORK FOR FREQUENCY DIVISION MULTIPLEX COMMUNICATION SYSTEM

[75] Inventor: Susumu Kitazume, Tokyo, Japan

[73] Assignee: Nippon Electric Company, Limited, Tokyo, Japan

[22] Filed: June 13, 1973

[21] Appl. No.: 369,622

[30] Foreign Application Priority Data

June 19, 1972 Japan ............................47-61516

[52] U.S. Cl.................. 333/6, 179/15 FD, 333/28 R

[51] Int. Cl.......... H03h 7/02, H03h 7/14, H04j 1/00

[58] Field of Search........ 179/15 FD, 15 FS, 15 FE; 333/6, 28 R

[56] References Cited

UNITED STATES PATENTS

| | | | |
|---|---|---|---|
| 2,607,851 | 8/1952 | Pfleger | 333/28 R X |
| 3,543,188 | 11/1970 | Livingston | 333/6 |

*Primary Examiner*—Paul L. Gensler

*Attorney, Agent, or Firm*—Sughrue, Rothwell, Mion, Zinn and Macpeak

[57] ABSTRACT

A branching filter network arrangement for use in microwave frequency division multiplex communications systems is disclosed. The network includes at least one branching filter having a center frequency higher than the highest frequency of the operating frequencies within the pass band and at least one branching filter having a center frequency lower than the lowest frequency of the operating frequencies within the pass band. As a result, primary delay distortion in the highest and lowest frequencies of the operating frequencies are eliminated, and only secondary delay distortion requires compensation which can be easily accomplished in the intermediate-frequency stage of the receiver.

4 Claims, 5 Drawing Figures

DELAY DISTORTIONS REDUCING BRANCHING FILTER NETWORK FOR FREQUENCY DIVISION MULTIPLEX COMMUNICATION SYSTEM

BACKGROUND OF THE INVENTION

1. Field of the Invention

This invention relates to a branching filter network arrangement for frequency division multiplex communication whose delay distortion characteristics are easily equalizable.

2. Description of the Prior Art

In a frequency-division multiplex radio communication system, modulated carrier waves have center frequencies allocated within the pass band of the system with a predetermined frequency spacing. These modulated radio-frequency carrier waves are multiplexed by frequency-division using a branching filter network arrangement. In the prior art, some radio-frequency carrier waves channels suffer delay distortion due to the branching filters provided for other radio-frequency carrier waves channels. This delay distortion is of two types:

1 The lowest or the highest frequency channel within the frequency allocation of the pass band suffers either positive- or negative- sense primary delay distortion due to the branching filters provided for neighboring frequency channels; and 2 Other intermediate frequency channels within the pass band suffer a smaller amount of secondary delay distortion as a result of the mutual compensation between the intermediate frequency channels.

Consequently, with such a branching filter network arrangement, the transmission characteristics for the highest and the lowest frequencies, which are effected by primary delay distortion, are deteriorated as compared with other, intermediate frequency channels.

In microwave communication systems, it is the practice to compensate for such delay distortion in the intermediate-frequency stage. To effect the compensation, not only the secondary, but also the primary delay equalizers must be constructed to compensate for positive and negative distortions.

Granting that the optimum equalization has been achieved in the I-F band, the need for the installation of too many primary delay equalizers complicates the design and makes the whole arrangement very expensive to manufacture.

SUMMARY OF THE INVENTION

Accordingly, it is the principal object of this invention to provide a simple and economical branching filter network arrangement capable of eliminating the channels affected by the primary delay distortion, thereby improving the transmission characteristics, so that the installation of only the secondary delay equalizers of standard design may be needed.

BRIEF DESCRIPTION OF THE DRAWINGS

The present invention will now be described in detail by reference to the accompanying drawings in which.

DESCRIPTION OF THE PREFERRED EMBODIMENT

Figure 1:
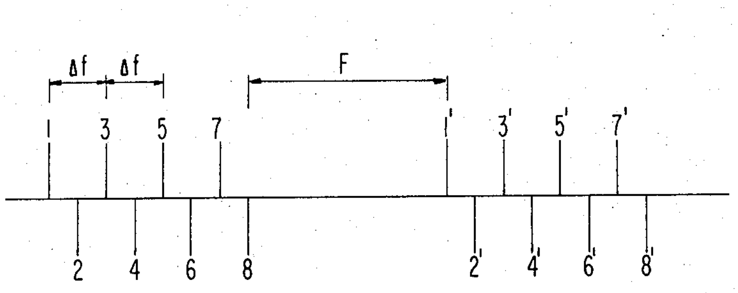
FIG. 1 is a graphical illustration of a frequency allocation commonly used in microwave communication systems.

A typical frequency allocation that has been most commonly used in microwave communication systems is schematically illustrated in FIG. 1, wherein the center carrier frequencies of several radio frequency channels in each of the vertical and horizontal polarization groups, whose polarization planes are orthogonal to each other, are arranged side by side, being spaced by a predetermined amount $\Delta f$ in succession, to constitute transmission or reception channel groups. Between two adjacent channel groups there is provided a predetermined frequency spacing commonly called the guard band F. In the case of FIG. 1, the radio-frequency channels 1 through 8, each having a different center frequency, constitute one carrier signal group, wherein 1, 3, 5 and 7; and 2, 4, 6 and 8 represent, respectively, channels of the vertical and horizontal polarization groups.

Furthermore, channels 1′ through 8′ constitute another carrier group, separated from the previously mentioned channel group by a spacing equal to the guard band F. A general branching filter network arrangement for one linear polarization group with such a frequency allocation is illustrated in FIG. 2.

Figure 2:
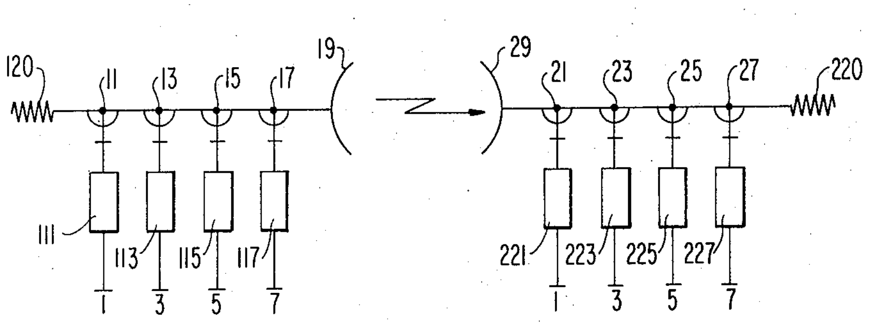
FIG. 2 PRIOR ART
FIG. 2 is a schematic diagram of a prior art branching filter network arrangement.

Referring to FIG. 2, it is seen that a combination of circulators 11, 13, 15 and 17 and band-pass filters 111, 113, 115 and 117 as a branching filter network for channels 1, 3, 5 and 7 of the vertical polarization group in FIG. 1 is disposed between an antenna 19 and a non-reflective termination 120 in the transmission system. In like manner, a combination of circulators 21, 23, 25 and 27 and band-pass filters 221, 223, 225 and 227 as a branching filter network for channels 1, 3, 5 and 7 is disposed between an antenna 29 and a non-reflective termination 220 in the reception system. It will be understood that a set of a circulator and a band-pass filter provided for each channel will hereinafter be called the branching filter network.

Figure 3:
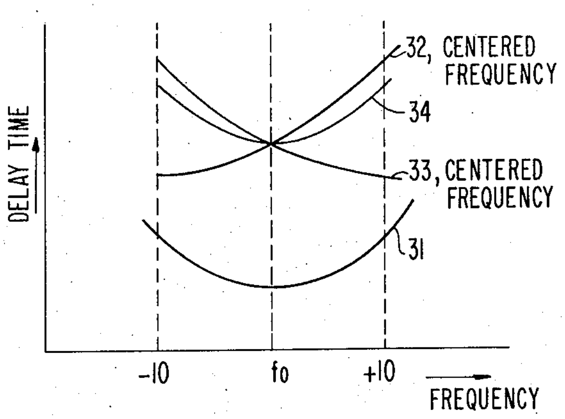
FIG. 3 shows a graphical representation of the compensation of the delay distortion caused due to the branching filter network.

Now the delay distortion characteristic of such a branching filter will be analyzed referring to FIG. 3 for a particular channel, for instance, the radio-frequency channel 3 in FIG. 2 In FIG. 3, the abscissa shows the input frequencies in the band-pass filter of the branching filter network, while the delay time arising from the passage or the reflection of the signal in the band-pass filter is given on the ordinate. A transmission signal from the radio-frequency channel 3 undergoes a secondary delay distortion, as indicated at curve 31 in FIG. 3, through the band-pass filter 113 which is a component of the branching filter network in the transmission system. The channel signal of the radio-frequency channel 3 which has undergone the delay distortion passes through the circulator 13 and is subsequently led to the circulator 15. After passing through the circulator 15, the signal is reflected by the band-pass filter

115. The center frequency of the band-pass filter 115 of the branching filter corresponding to the radio-frequency channel 5 is $f3 + \Delta f$. Therefore, the radio-frequency channel 3 undergoes from the band-pass filter 115 (centered on $fo + \Delta f$, $fo$ corresponding to the center frequency of the previously mentioned band-pass filter 113) of the radio-frequency channel 5 a primary delay distortion such that the amount of delay increases with increasing frequency, or a positive primary delay, as shown at curve 32.

In the branching filter network in the reception system, the signal of the radio-frequency channel 3 reaches its own branching filter after passage through the branching filter of radio-frequency channel 1. Since the center frequency of the branching filter of radio-frequency channel 1 is at $f3 - \Delta f$, radio-frequency channel 3 suffers, from the band-pass filter 221 (centered on $fo - \Delta f$) of radio-frequency channel 1, a primary delay distortion, which decreases with increasing frequency, or a negative primary delay, as shown at curve 33. Accordingly, there will occur a delay distortion equal in amount to the sum of delay distortions 32 and 33 between the transmission and reception systems. Therefore, the resultant delay characteristic 34 will be of the secondary and not of the primary delay type. The foregoing description holds equally true for the radio-frequency channel 5.

Delay distortion due to a branching filter ranked second in position from the filter which we mentioned above (for instance, channel 7 for channel 3 and channel 1 for channel 5) is disregarded, because such design considerations can easily be effected.

Now, channel 1 is affected by a positive delay distortion with the characteristic as indicated by curve 32 in FIG. 3 from channel 3 in the branching filter network of the transmission system, but it is unaffected by any other channels in the branching filter network of the reception system. Therefore, the primary delay distortion that has been introduced in the transmission system remains uncompensated. Conversely, channel 7 is unaffected in the transmission system, but is affected by a negative primary delay distortion in the branching filter network of the reception system so that the primary delay distortion remains uncompensated.

Figure 4:
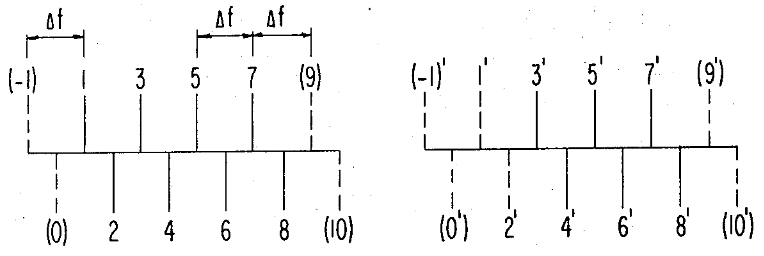
FIG. 4 shows the frequency allocation for a microwave communication system in which a branching filter network arrangement according to an embodiment of this invention is employed.

Referring now to FIG. 4 showing a frequency allocation of a system comprising a branching filter network arrangement according to this invention, it is seen that a branching filter designed for operation in a frequency band centered on a frequency lower than the lowest frequency in each channel group by $\Delta f$ and a branching filter designed for operation in a frequency band centered on a frequency higher than the highest frequency in each channel group by $\Delta f$ are provided for incorporation into a prior art branching filter network arrangement.

Figure 5:
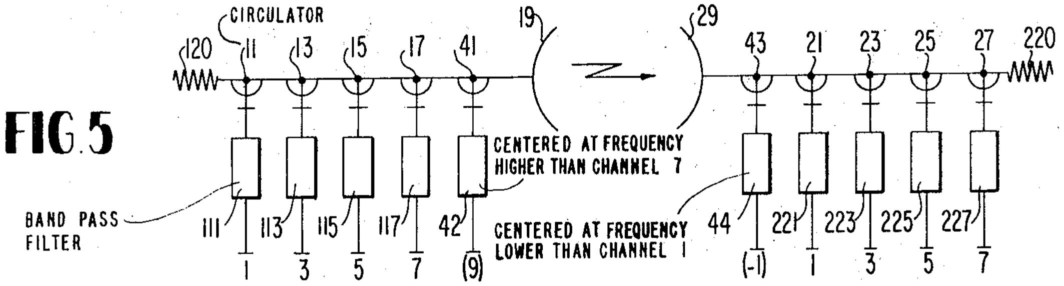
FIG. 5 schematically shows a branching filter network arrangement according to an embodiment of this invention.

Referring to FIG. 5 showing a branching filter network arrangement according to this invention, it will be understood that like reference numerals are used in FIG. 5 to identify like components shown in FIG. 2. A branching filter network having the center frequency at $f_7+\Delta f$ and composed of a circulator 41 and a band-pass filter 42 is installed between the branching filter network of the radio-frequency channel 7 and the antenna 19 in the branching filter network arrangement of the transmission system. Likewise, a branching filter network composed of a circulator 43 and a band-pass filter 44 is installed between the branching filter network of channel 1 and the antenna 29 in the branching filter network arrangement of the reception system.

By this modification of the conventional network design, the positive primary delay distortion of the signal of channel 1 caused by band-pass filter 113 of channel 3 is compensated by the negative delay distortion caused by the reflection at the band-pass filter 44 centered on a frequency lower than channel 1 by $\Delta f$ in the reception system. As a consequence, only secondary delay distortion remains to be compensated. In like manner, the primary delay distortion of the signal of channel 7 is cancelled by delay distortion caused by the reflection as the band-pass filter 42 centered at a frequency higher than channel 7 by $\Delta f$ in the transmission system and the band-pass filter 225 of channel 5 in the reception system. Consequently, secondary delay distortion only remains uncompensated.

Description has been so far made of a branching filter network arrangement in which the radio-frequency channels are disposed in the order of 1, 3, 5 and 7 in the transmission system and in the order of 7, 5, 3 and 1 in the reception system as counted from the remotest side of the respective antenna. This order is by no means essential to the present invention; each of these orders may be reversed such as 7, 5, 3 and 1 in the transmission system and 1, 3, 5 and 7 in the reception system as counted from the remotest side of the respective antenna. Furthermore, these orders may be interchanged between the transmission and reception systems. Where the numerical orders of the radio-frequency channels are taken as 1, 3, 5 and 7 (or 7, 5, 3 and 1) in the transmission system and as 1, 3, 5 and 7 (or 7, 5, 3 and 1) in the reception system as counted from the remotest side of the respective antenna, the channel 7 (or 1) can eliminate the primary delay distortion without the branching filter network arrangement according to this invention. But the primary delay distortion amount of the channel 1 (or 7) would be doubled, were it not for the network of this invention. To eliminate the primary delay distortion, therefore, the branching filter network arrangement of this invention should be quite effective.

While a description has been made above of the type of branching filter composed of a circulator and a band-pass filter, the equivalent effect could be obtained by any other suitable type branching filter and hence, the principles of this invention are unaffected by the specific structure used to practice the invention.

What is claimed is:

1. A branching filter network providing primary delay distortion compensation for use in a frequency-division multiplex radio communication system for the transmission and/or reception of a plurality of radio-frequency channels having their center frequencies spaced apart in succession by a predetermined amount, said filter network comprising:

a. at least one plurality of branching filter means equal in number to the number of said plurality of radio-frequency channels, each of said branching filter means being disposed along a transmission path and arranged in a sequence such that the center frequency of each intermediate filter means is spaced by a predetermined fixed amount from the center frequencies of adjacent branching filter means;

b. at least one additional branching filter means for operation in a frequency channel centered on a frequency higher than the highest frequency of the operating frequencies of said plurality of radio-frequency channels; and c. at least one additional branching filter channel means for operation in a frequency centered on a frequency lower than the lowest frequency of the operating frequencies of said plurality of radio-frequency channels.

2. A branching filter network as recited in claim 1 wherein said radio-frequency channels are in the micro-wave region and each of said branching filter means comprises:

a. a circulator; and b. a band-pass filter.

3. A branching filter network as recited in claim 1 wherein there are first and second pluralities of branching filter means, said first plurality being located in the transmitter and arranged in ascending frequency order along said transmission path referenced to a point remotest from the antenna of the transmitter, and said second plurality being located in the receiver of said communication system and arranged in descending order referenced from the point remotest from the antenna in the receiver, said additional filter means for operation in a frequency channel centered on a frequency higher than the highest frequency of the operating frequencies being grouped with said first plurality, and said additional filter means for operation in a frequency centered on a frequency lower than the lowest of the operating frequencies being grouped with said second plurality.

4. A branching filter network as recited in claim 1 wherein there are first and second pluralities of branching filter means, said first plurality being located in the transmitter and arranged in descending frequency order along said transmission path referenced to a point remotest from the antenna of the transmitter, and said second plurality being located in the receiver of said communication system and arranged in ascending order referenced from the point remotest from the antenna in the receiver, said additional means for operation in a frequency channel centered on a frequency lower than the lowest frequency of the operating frequencies being grouped with said first plurality, and said additional filter means for operation in a frequency centered on a frequency higher than the highest of the operating frequencies being grouped with said second plurality.

* * * * *